United States Patent
Henia et al.

(10) Patent No.: US 12,069,006 B2
(45) Date of Patent: Aug. 20, 2024

(54) SYSTEMS AND METHODS FOR TIME DIVISION DUPLEX (TDD) SYNCHRONIZING IN DISTRIBUTED COMMUNICATION SYSTEMS (DCSs)

(71) Applicant: Corning Research & Development Corporation, Corning, NY (US)

(72) Inventors: Yona Henia, Mazkeret Batia (IL); Guy Horwitz, Ness Ziona (IL); Gila Shmueli, Mazkeret Batya (IL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 551 days.

(21) Appl. No.: 17/351,572

(22) Filed: Jun. 18, 2021

(65) Prior Publication Data
US 2022/0407670 A1   Dec. 22, 2022

(51) Int. Cl.
*H04L 5/14* (2006.01)
*H04L 7/00* (2006.01)

(52) U.S. Cl.
CPC ............. *H04L 5/14* (2013.01); *H04L 7/0016* (2013.01)

(58) Field of Classification Search
CPC ........................................................ H04L 5/14
See application file for complete search history.

(56) References Cited

U.S. PATENT DOCUMENTS

| | | | |
|---|---|---|---|
| 6,085,209 A * | 7/2000 | Pan .................... | H03H 17/0261 708/517 |
| 2017/0094679 A1* | 3/2017 | Lupescu .......... | H04B 10/25754 |
| 2017/0201322 A1* | 7/2017 | Harel ................ | H04W 88/085 |
| 2017/0207871 A1 | 7/2017 | Shim et al. | |
| 2017/0279567 A1 | 9/2017 | Rahman et al. | |
| 2018/0020467 A1 | 1/2018 | Nouah et al. | |
| 2018/0263035 A1 | 9/2018 | Ben-Shlomo et al. | |
| 2018/0302210 A1 | 10/2018 | Hedin et al. | |
| 2018/0351633 A1 | 12/2018 | Birkmeir et al. | |
| 2019/0028187 A1 | 1/2019 | Gutman et al. | |
| 2019/0044675 A1 | 2/2019 | Li et al. | |
| 2019/0182021 A1 | 6/2019 | Shokri Razaghi et al. | |
| 2019/0182753 A1 | 6/2019 | Belleschi et al. | |
| 2019/0207739 A1 | 7/2019 | Aktas et al. | |
| 2019/0230662 A1 | 7/2019 | Ben-Shlomo et al. | |
| 2019/0261292 A1 | 8/2019 | Thomas | |
| 2020/0044728 A1 | 2/2020 | Birkmeir et al. | |
| 2020/0053669 A1 | 2/2020 | Hannan et al. | |
| 2020/0228217 A1 | 7/2020 | Ahn et al. | |
| 2020/0236676 A1 | 7/2020 | Ben-Shlomo et al. | |
| 2020/0259629 A1 | 8/2020 | Ovesjö et al. | |
| 2020/0313836 A1 | 10/2020 | Kang | |
| 2020/0343938 A1 | 10/2020 | Medina Acosta et al. | |

(Continued)

*Primary Examiner* — Abdeltif Ajid
(74) *Attorney, Agent, or Firm* — William D. Doyle

(57) ABSTRACT

Systems and methods for time division duplex (TDD) synchronizing in distributed communication systems (DCSs) synchronize remote units operating with 5G signals by initially connecting these remote units to a 4G TDD source, and once the remote units are synchronized, switching back to a 5G TDD source. By using the downlink synchronization process of 4G instead of the normal synchronization process of 5G, the synchronization of the remote units using 5G is expedited. Further, the 5G receiver is not compressed or otherwise negatively impacted.

17 Claims, 8 Drawing Sheets

(56) References Cited

U.S. PATENT DOCUMENTS

2020/0344619 A1 10/2020 Gormley et al.
2021/0127375 A1 4/2021 Hoglund et al.
2021/0306127 A1 9/2021 Sundberg et al.
2021/0328754 A1 10/2021 Imanilov et al.
2021/0376992 A1 12/2021 Lightstone et al.

* cited by examiner

SYSTEMS AND METHODS FOR TIME DIVISION DUPLEX (TDD) SYNCHRONIZING IN DISTRIBUTED COMMUNICATION SYSTEMS (DCSs)

BACKGROUND

The disclosure relates generally to a distributed communication system (DCS) that include wireless components operating with signals complying with 4G and 5G cellular standards and, more particularly, to providing time division duplex (TDD) synchronization for both 4G- and 5G-compliant signals.

Wireless customers are increasingly demanding digital data services, such as streaming video signals. At the same time, some wireless customers use their wireless communication devices in areas that are poorly serviced by conventional cellular networks, such as inside certain buildings or areas where there is little cellular coverage. One response to the intersection of these two concerns has been the use of distributed antenna systems (DASs). DASs include remote units configured to receive and transmit communication signals to client devices within the antenna range of the remote units. DASs can be particularly useful when deployed inside buildings or other indoor environments where the wireless communication devices may not otherwise be able to effectively receive radio frequency (RF) signals from a source.

DASs are especially effective in extending indoor coverage for high-speed and high-throughput wireless broadband technologies like long-term evolution (LTE). LTE is a high-speed wireless technology developed by the Third Generation Partnership Project (3GPP) as a next generation technology and is sometimes referred to as a 4G standard. LTE is defined to support both the paired spectrum for frequency-division duplex (FDD) and the unpaired spectrum for TDD. More recently, 3GPP has promulgated a fifth generation technology, frequently referred to as 5G or 5G New Radio (5G-NR). 5G also is defined to support both the paired spectrum for FDD and the unpaired spectrum for TDD.

In TDD, communication signals are communicated in repetitively alternating downlink (DL) and uplink (UL) periods that occupy the same frequency band. In this regard, DL communication can only take place during DL periods and UL communication can only take place during UL periods. TDD requires that the endpoints of the communication (e.g., a user device and a base station) be synchronized so that the endpoints send and receive in the appropriate DL and UL periods.

No admission is made that any reference cited herein constitutes prior art. Applicant expressly reserves the right to challenge the accuracy and pertinency of any cited documents.

SUMMARY

Exemplary aspects of the present disclosure provide systems and methods for time division duplex (TDD) synchronizing in distributed communication systems (DCSs). In particular, exemplary aspects synchronize remote units operating with 5G signals by initially connecting these remote units to a 4G TDD source, and once the remote units are synchronized, switching back to a 5G TDD source. By using the downlink synchronization process of 4G instead of the normal synchronization process of 5G, the synchronization of the remote units using 5G is expedited. Further, the 5G receiver is not compressed or otherwise negatively impacted.

In this regard, in one embodiment, a head end configured for use in a distributed communication system is disclosed. The head end comprises a first TDD radio interface module (RIM) configured to synchronize based on a downlink signal. The head end also comprises a second TDD RIM. The head end also comprises a summation circuit. The head end also comprises a first switch coupling the first TDD RIM to the summation circuit. The head end also comprises a second switch coupling the second TDD RIM to the summation circuit. The head end also comprises a control circuit. The control circuit is configured to, while in a synchronization state, close the first switch to couple the first TDD RIM to the summation circuit and open the second switch to disconnect the second TDD RIM from the summation circuit. The control circuit is also configured to, after determining that synchronization is complete, close the second switch to connect the second TDD RIM to the summation circuit and open the first switch to disconnect the first TDD RIM from the summation circuit.

In another embodiment, a method for synchronizing service groups in a head end is disclosed. The method comprises, while in a synchronization state, closing a first switch to couple a first TDD RIM to a summation circuit and opening a second switch to disconnect a second TDD RIM from the summation circuit. The method also comprises, after determining that synchronization is complete, closing the second switch to connect the second TDD RIM to the summation circuit and opening the first switch to disconnect the first TDD RIM from the summation circuit.

In another embodiment, a distributed communication system is disclosed. The distributed communication system comprises a head end. The head end comprises a first TDD RIM configured to synchronize based on a downlink signal. The head end also comprises a second TDD RIM. The head end also comprises a summation circuit. The head end also comprises a first switch coupling the first TDD RIM to the summation circuit. The head end also comprises a second switch coupling the second TDD RIM to the summation circuit. The head end also comprises a control circuit. The control circuit is configured to, while in a synchronization state, close the first switch to couple the first TDD RIM to the summation circuit and open the second switch to disconnect the second TDD RIM from the summation circuit. The control circuit is also configured to, after determining that synchronization is complete, close the second switch to connect the second TDD RIM to the summation circuit and open the first switch to disconnect the first TDD RIM from the summation circuit. The distributed communication system also comprises a plurality of remote units coupled to the first TDD RIM through a first optical fiber. The distributed communication system also comprises a second plurality of remote units coupled to the second TDD RIM through a second optical fiber.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Exemplary aspects of the present disclosure provide systems and methods for time division duplex (TDD) synchronizing in distributed communication systems (DCSs). In particular, exemplary aspects synchronize remote units operating with 5G signals by initially connecting these remote units to a 4G TDD source, and once the remote units are synchronized, switching back to a 5G TDD source. By using the downlink synchronization process of 4G instead of the normal synchronization process of 5G, the synchronization of the remote units using 5G is expedited. Further, the 5G receiver is not compressed or otherwise negatively impacted.

Figure 1A:
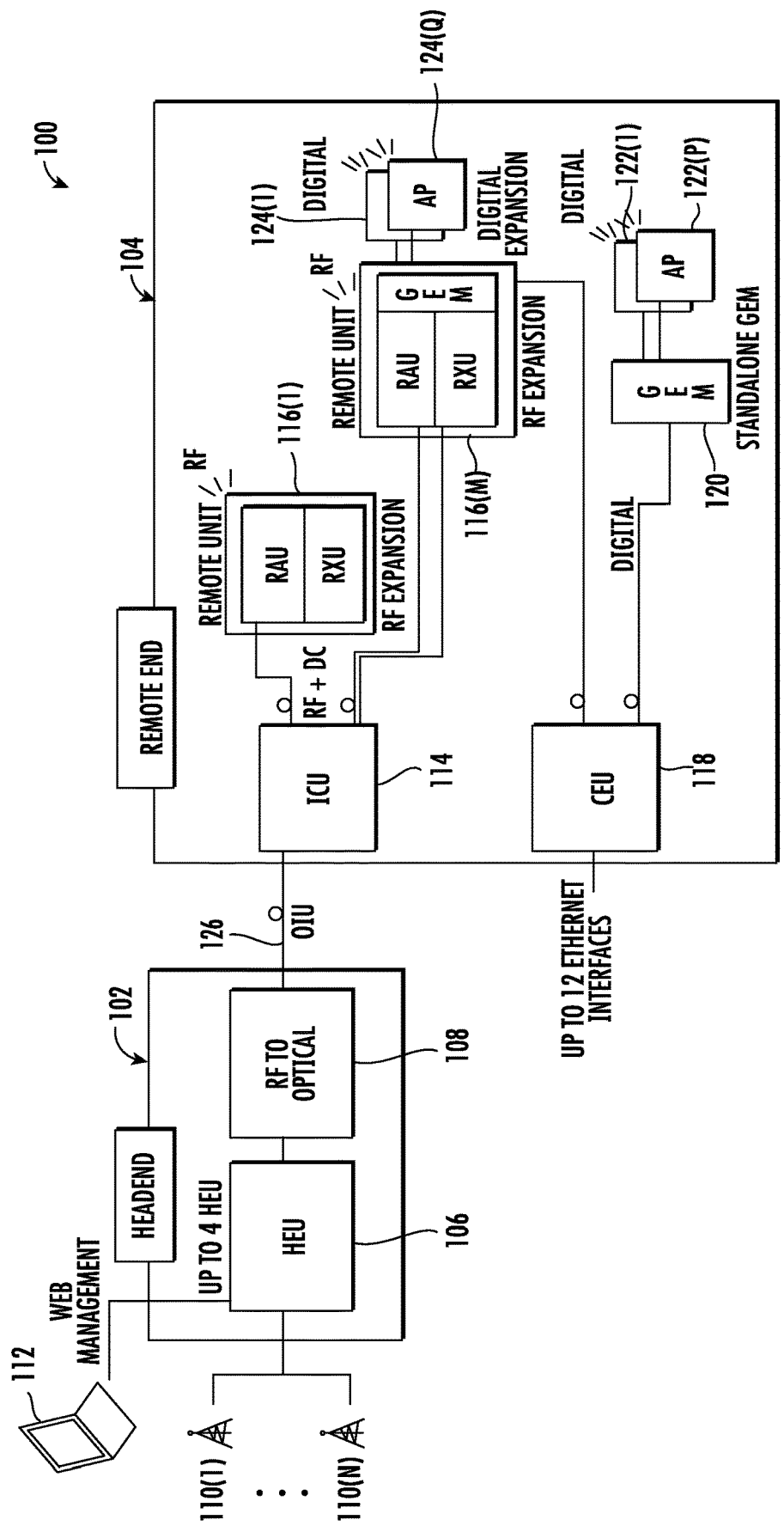
FIG. 1A is a block diagram of a distributed antenna system (DAS) that may employ synchronization techniques according to exemplary aspects of the present disclosure.

In this regard, FIG. 1A illustrates a distributed antenna system (DAS) 100 having a head end 102 and a remote end 104. The head end 102 may include one or more head end units (HEUs) 106 (although typically no more than four (4) are present). The HEU 106 may be coupled to respective radio frequency (RF) to optical (RF-to-O) conversion units 108 (only one shown). The RF-to-O conversion unit 108 may sometimes be referred to as an optical interface module. The HEU 106 may further be coupled to one or more RF services 110(1)-110(N) (generically RF service 110). Typically, up to twelve (12) RF services 110 may be coupled to a given HEU 106, so if there are four HEUs 106, N may be forty-eight (48). An RF service 110 may be a cellular service provider (e.g., AT&T, VERIZON) or the like, and a given provider may have multiple services depending on technologies (4G vs 5G), frequency bands, or the like. The HEU 106 may further be connected to a computer 112, which in an exemplary aspect is a web management computer.

With continued reference to FIG. 1A, the remote end 104 may include an interconnect unit (ICU) 114 coupled to one or more remote units (RUs) 116(1)-116(M). Further, the remote end 104 may include a centralized ethernet unit (CEU) 118 that may connect to one or more Ethernet interfaces, although typically no more than twelve (12) are so coupled (not shown explicitly). The CEU 118 may couple to at least one RU 116(M) as well as a gigabit ethernet unit (GEM) 120. The GEM 120 may connect to a plurality of access points (APs) 122(1)-122(P). Additionally, at least one RU 116(M) may connect to a second plurality of APs 124(1)-124(Q). In an exemplary aspect, the APs 122(1)-122(P), 124(1)-124(Q) provide digital signals while the RUs 116(1)-116(M) provide analog RF signals.

The head end 102 may be coupled to the remote end 104 via an optical interface unit (OIU) 126 such as one or more fiber optic cables.

Figure 1B:
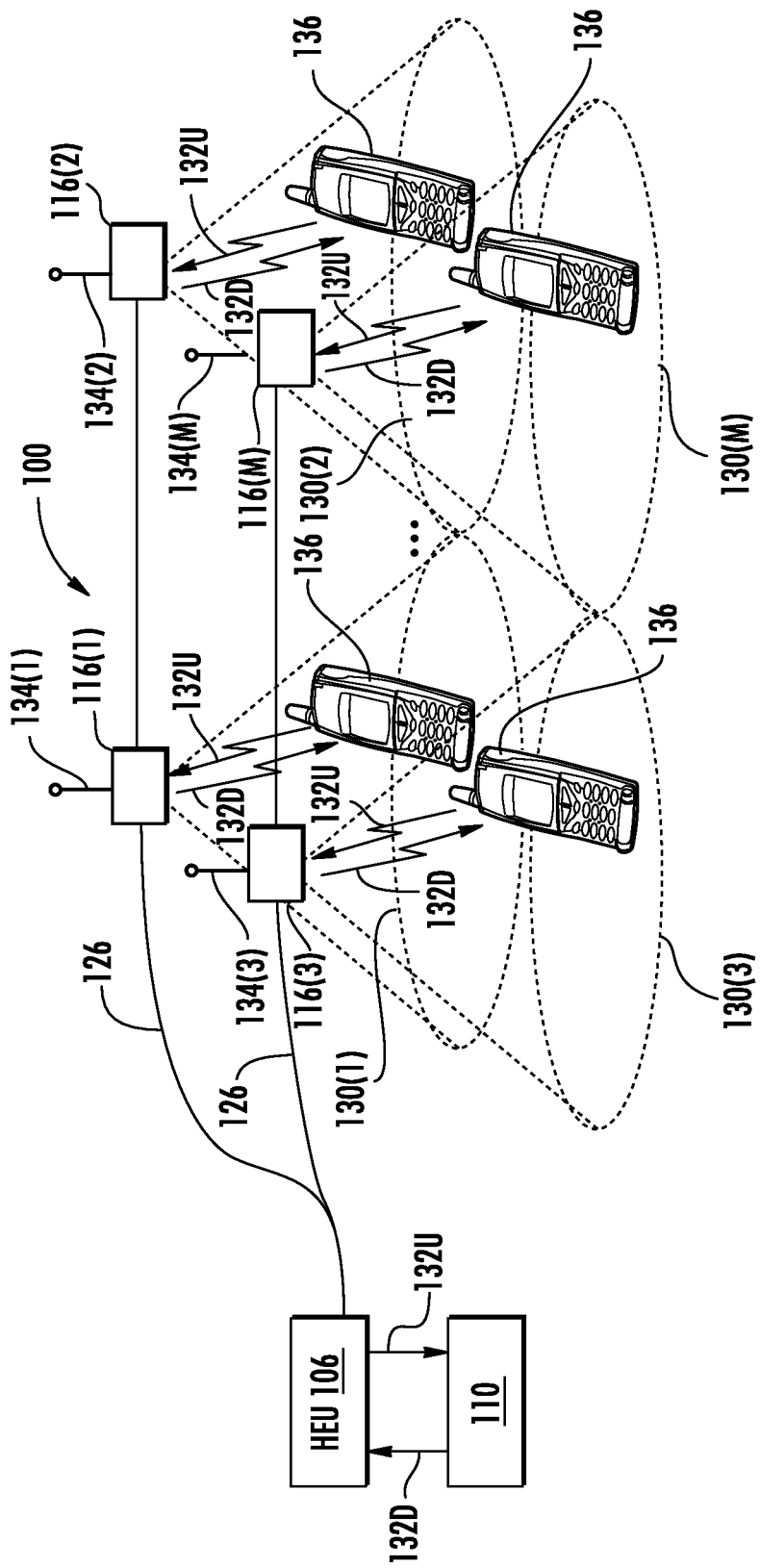
FIG. 1B is a stylized representation of the DAS of FIG. 1A showing remote units of the DAS communicating with user equipment.

FIG. 1B illustrates the DAS 100 in operation and configured to distribute communication services to remote coverage areas 130(1)-130(M). The DAS 100 can be configured to support a variety of communication services that can include cellular communication services, wireless communication services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 130(1)-130(M) are created by and centered on the RUs 116(1)-116(M) connected to a central unit, which may be the head end unit 106. The head end unit 106 may be communicatively coupled to a component of an RF service 110, such as for example, a base transceiver station (BTS) or a baseband unit (BBU). In this regard, the head end unit 106 receives downlink communication signals 132D from the RF service 110 to be distributed to the RUs 116(1)-116(M). The downlink communication signals 132D can include data communication signals and/or communication signaling signals, as examples. The head end unit 106 may be configured with filtering circuits and/or other signal processing circuits that are configured to support a specific number of communication services in a particular frequency bandwidth (i.e., frequency communication bands). The downlink communication signals 132D are communicated by the head end unit 106 over the OIU 126 to the RUs 116(1)-116(M).

With continuing reference to FIG. 1B, the RUs 116(1)-116(M) are configured to receive the downlink communication signals 132D from the head end unit 106 over the OIU 126. The downlink communication signals 132D are configured to be distributed to the respective remote coverage areas 130(1)-130(M) of the RUs 116(1)-116(M). The RUs 116(1)-116(M) are also configured with filters and other signal processing circuits that are configured to support all or a subset of the specific communication services (i.e., frequency communication bands) supported by the head end unit 106. Each of the RUs 116(1)-116(M) may include an RF transmitter/receiver (not shown explicitly) and a respective antenna 134(1)-134(M) operably connected to the RF transmitter/receiver to distribute wirelessly the communication services to user equipment (UE) 136 within the respective remote coverage areas 130(1)-130(M). The RUs 116(1)-116(M) are also configured to receive uplink communication signals 132U from the UE 136 in the respective remote coverage areas 130(1)-130(M) to be distributed to the RF service 110.

Figure 1C:
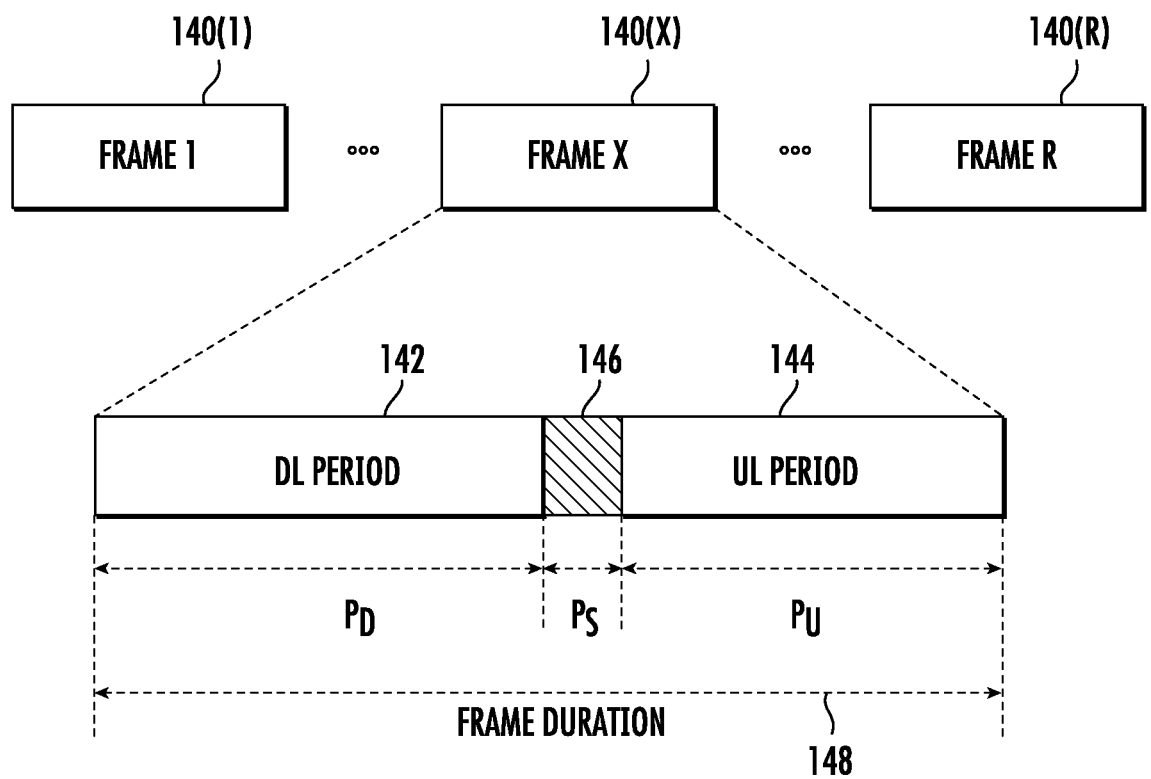
FIG. 1C is a diagram of a frame used in a time division duplex (TDD) technology in the DAS of FIG. 1A or 1B.

As noted above, both 4G and 5G may support TDD. TDD contemplates a frame, such as frames 140(1)-140(R) illustrated in FIG. 1C. Exemplary frame 140(X) is used to illustrate portions of a frame, with the understanding that other frames 140(1)-140(R) also include these portions. In particular, the frame 140(X) may include a downlink period 142 having a duration PD and an uplink period 144 having a duration Pu with a turnaround or switch period 146 having a duration of Ps. Collectively, the frame 140(X) has a frame duration 148 of PD+Pu+Ps.

A given DAS 100 may include both 4G and 5G signals. As noted above, TDD requires that the endpoints of the communication are synchronized so that they do not talk over each other. That is, if the head end unit 106 is a source and signals to an RU 116 are considered downlink while signals from the RU 116 to the head end unit 106 are uplink, the head end unit 106 and the RU 116 must be synchronized so that the RU 116 does not transmit during the downlink period 142 and the head end unit 106 does not transmit during the uplink period 144. 4G and 5G both define specific ways in which synchronization may occur. In the absence of the present disclosure, 4G provides that the UE 136 synchronize on the BTS in the downlink period 142 using the LTE synchronization and pilot signals. While 5G systems also synchronize during the downlink period 142, the act of synchronizing only occurs when there is an active downlink signal (i.e., there is an active UE 136 within a coverage area). The 5G approach is limited in that there may not be a constant pattern of uplink user data that generates corresponding downlink data from which to synchronize. As such, 4G signals will typically synchronize faster than 5G signals. In extreme cases, the 4G signals will operate in the downlink state when the 5G signals that have not yet synchronized try to operate in an uplink state. The 4G signals may thus compress or crowd the 5G signals to such an extent that the 5G signals are unable to establish a connection with the RF service 110.

Exemplary aspects of the present disclosure implement a synchronization process for both 4G and 5G signals based on the initial 4G synchronization process. That is, a service group normally dedicated to serving 5G signals may be disconnected from the 5G TDD signals and connected to the 4G TDD signals until synchronization is achieved, then the 5G TDD signals are reconnected while the 4G TDD signals are disconnected. This process allows rapid synchronization for the 5G service group and avoids any compression of the 5G receiver thereby reducing the chance that the 5G signals fail to establish a connection with the RF service 110. While 4G and 5G are particularly contemplated, it should be appreciated that any pair of signaling schemes where there are differences in TDD synchronization may benefit from the present disclosure.

Figure 2A:
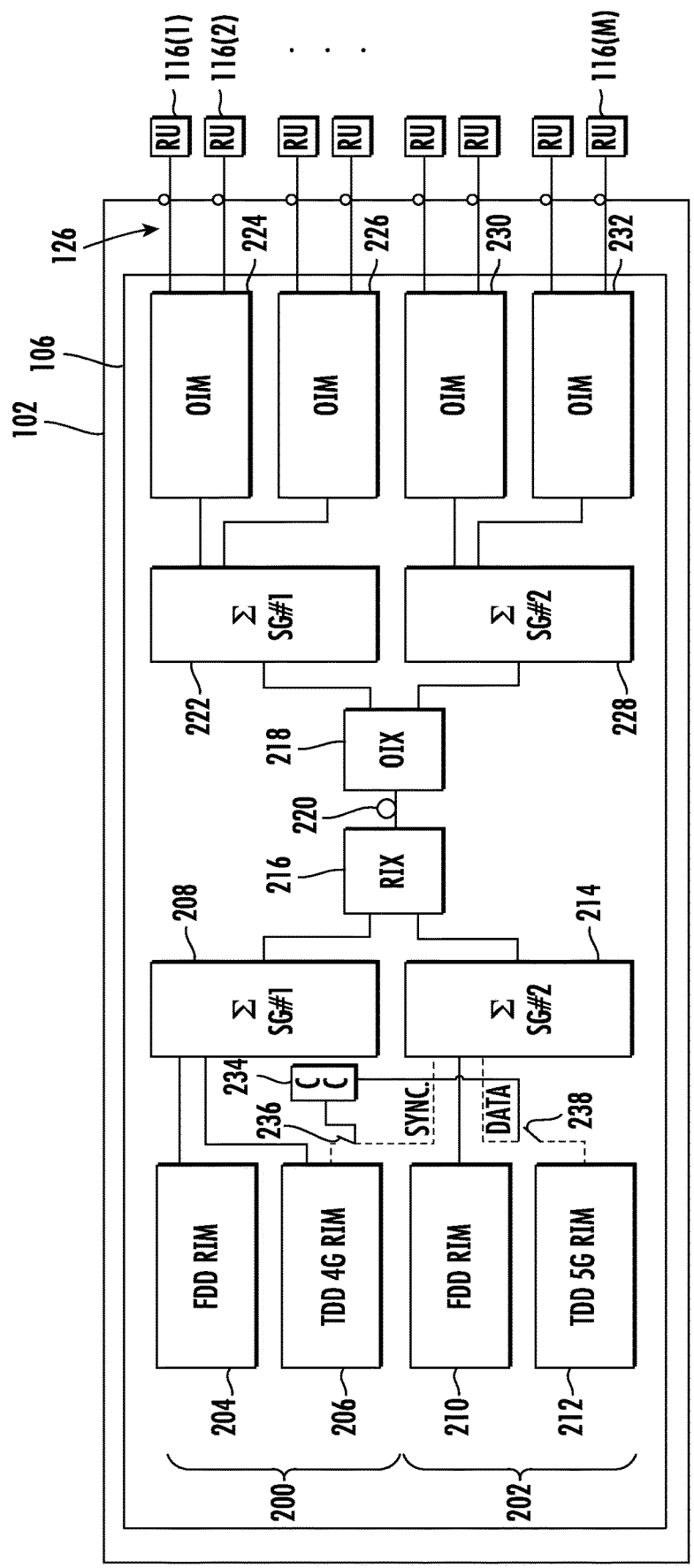
FIG. 2A is a block diagram of a portion of a head end unit of the DAS of FIG. 1A.

FIG. 2A illustrates a head end 102 that has the appropriate switching capabilities to implement processes according to exemplary aspects of the present disclosure. In particular, the head end 102 may have a head end unit 106 with a first service group 200 corresponding to a 4G signal set and a second service group 202 corresponding to a 5G signal set. The first service group 200 may include a frequency-division duplex (FDD) radio interface module (RIM) 204 and a TDD 4G RIM 206. Signals from the RIMS 204, 206 are provided to and summed by a summation circuit 208. Similarly, the second service group 202 may include an FDD RIM 210 and a TDD 5G RIM 212. Signals from the RIMS 210, 212 are provided to and summed by a second summation circuit 214. The outputs of the summation circuits 208, 214 are provided to a radio interface expander (MX) 216, which is connected to an optical interface expander (OIX) 218 by a coaxial cable 220. The expanders 216, 218 may provide amplification and be associated with optical-to-electrical (O/E) conversion circuitry (not shown) as is well understood.

With continued reference to FIG. 2A, the first service group 200 further includes another summation circuit 222 that sums incoming or uplink signals from optical interface modules (OIMs) 224, 226. The second service group 202 further includes another second summation circuit 228 that sums incoming or uplink signals from OIMs 230, 232. The OIMs 224, 226, 230, 232 are coupled through the OIU 126 to the RUs 116(1)-116(M).

With continued reference to FIG. 2A, a control circuit 234 (also referred to as CC in FIG. 2) is provided which controls switches 236, 238 that selectively couple the 4G TDD RIM 206 and the 5G TDD RIM 212, respectively, to the second summation circuit 214. The switches 236, 238 are used to disconnect the 5G TDD RIM 212 from the second summation circuit 214 and connect the 4G TDD RIM 206 to the second summation circuit 214 during synchronization so that the 4G synchronization process may be used for the 5G signals.

Figure 2B:
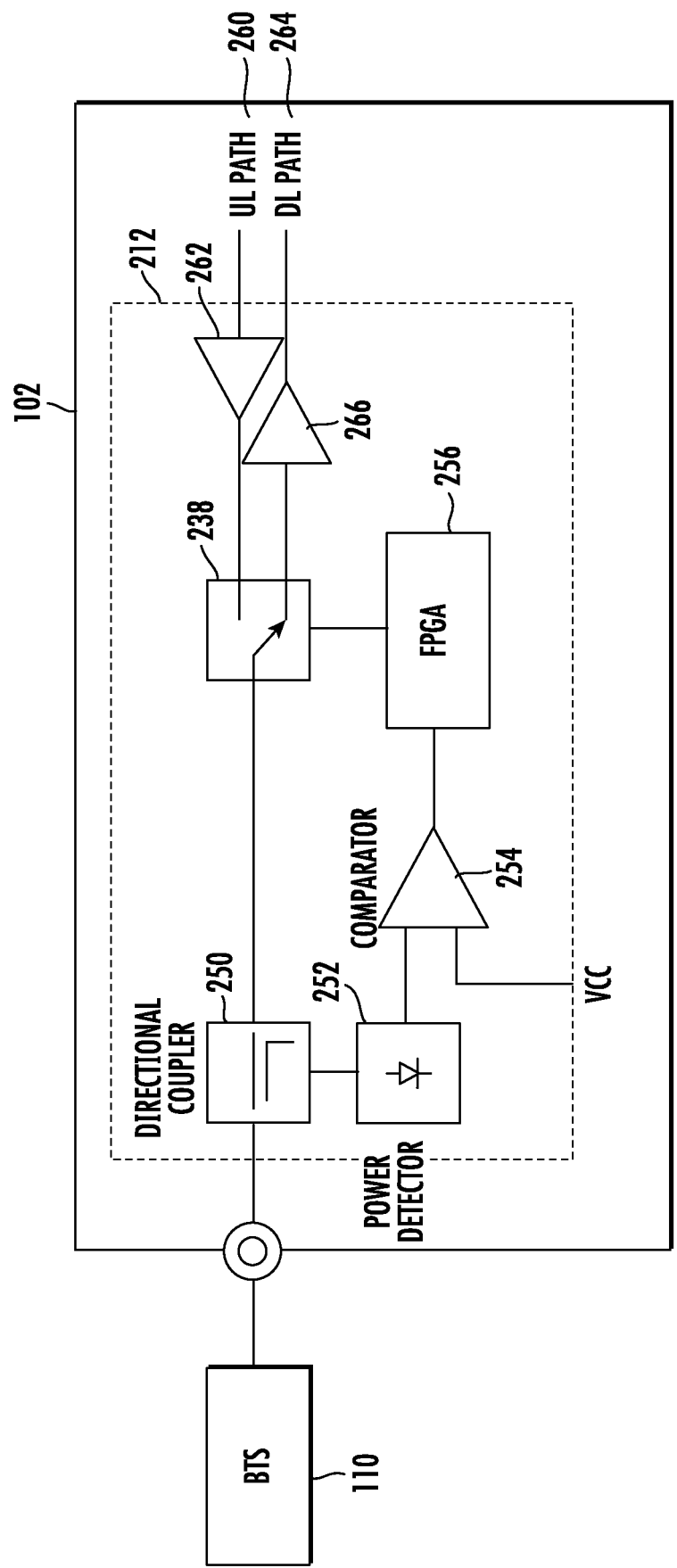
FIG. 2B is a block diagram of a TDD mechanism within a radio interface module (RIM) of FIG. 2A.

FIG. 2B illustrates a more detailed block diagram of the 5G TDD RIM 212. In particular, the TDD 5G RIM 212 includes a directional coupler 250 that provides a signal to a power detector 252 that may act as an envelope detector. The power detector 252 provides a signal to a comparator 254, which also receives a variable Vcc signal to determine if there is a valid signal or only noise as well as provide a threshold to differentiate between uplink and downlink signals. The comparator 254 outputs a "1" when downlink signals are being transmitted and outputs a "0" when uplink signals are being transmitted. The output of the comparator 254 is provided to a field programmable gate array (FPGA) 256. The FPGA 256 controls a switch 258 that controls whether an uplink or downlink transmission is occurring. As a default, the switch 258 begins in an uplink mode so that incoming uplink signals from UE can be detected. The switch 258 is coupled to an uplink path 260 which has an amplifier 262 and to a downlink path 264, which has an amplifier 266.

In use, the comparator 254 will output a zero unless downlink energy was detected in that place inside a frame. If downlink energy was detected, timeslots within the frame and subsequent frames are reserved. Further timeslots may be added in any and all places where downlink energy was seen in the next frames. If no legal uplink or downlink pattern was detected by the comparator 254, the TDD mechanism will reset and start synchronizing from the beginning. In the absence of the present disclosure, 5G, by design, sends almost no downlink data unless there are users in the system. Accordingly, there may be relatively little downlink data from which to synchronize unless there are users in the system. By switching to the 4G TDD synchronization mechanism, exemplary aspects of the present disclosure are not dependent on the presence or absence of users in the system and synchronization may occur with greater rapidity.

Figure 3:
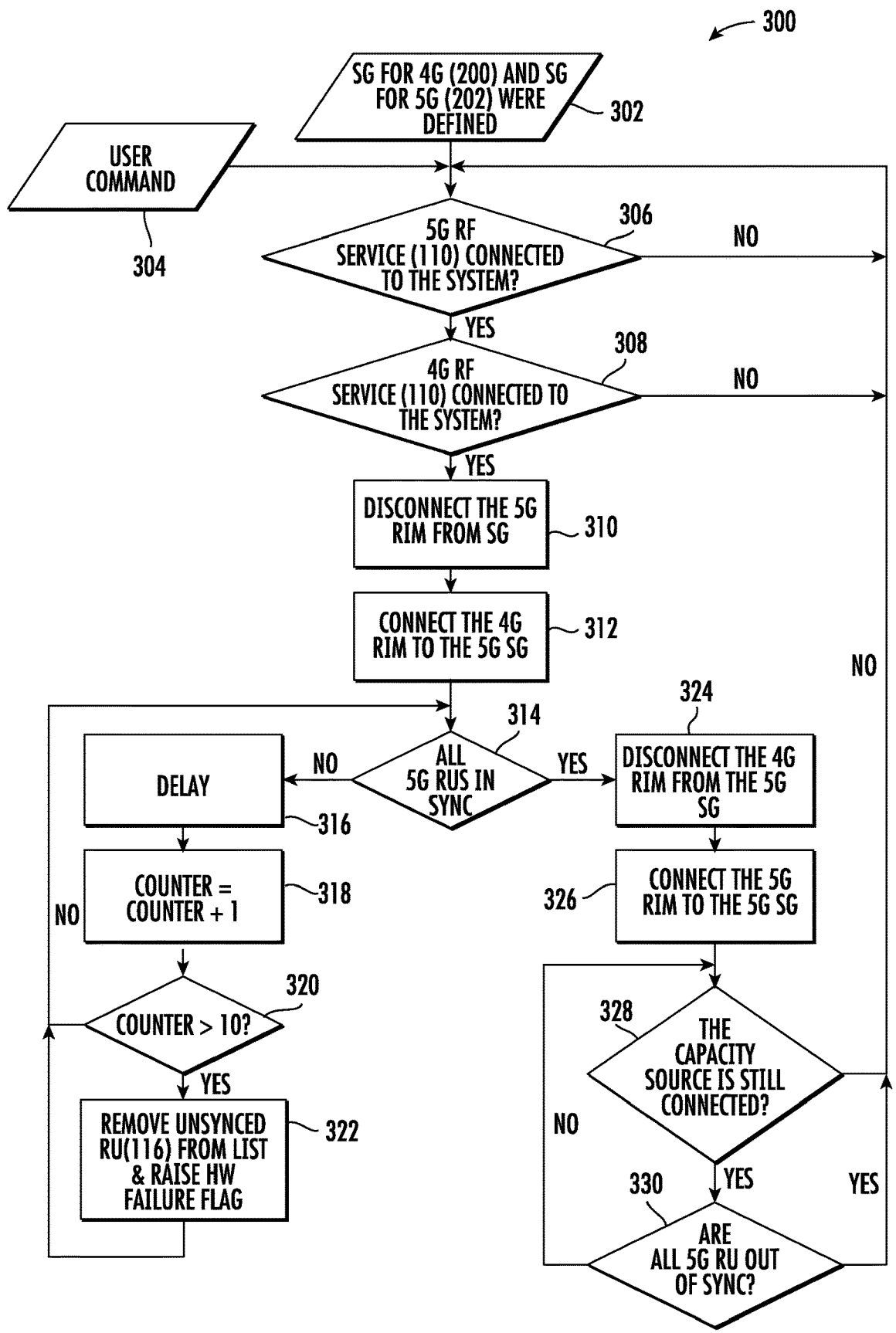
FIG. 3 is a flowchart showing a process of synchronizing 4G and 5G signals in the DAS of FIG. 1A or 1B using exemplary aspects of the present disclosure.

More particularly, a process 300 is illustrated in FIG. 3 that allows for the synchronization using the switches 236, 238 and the TDD RIMS 206, 212. In this regard, the process 300 begins with the installation of a DAS 100 where the first service group 200 for 4G service and the second service group 202 for 5G service are defined (block 302). A user command (block 304) may be provided such as through the web management computer 112 to initiate synchronization or entry into a synchronization state. The head end 102, and more specifically the control circuit 234, then determines if a 5G RF service 110 is connected to the DAS 100 (block 306). If the answer to block 306 is no, there is no 5G RF service 110, then the process 300 returns to the beginning to check for the 5G RF service 110 again. Once the 5G RF service 110 is connected and block 306 is answered yes, the control circuit 234 determines if a 4G RF service 110 is connected to the DAS 100 (block 308). If the answer to block 308 is no, there is no 4G RF service 110, then the process 300 returns to the beginning to check for the 5G and 4G RF services 110 again. Note that the order of blocks 306 and 308 may be reversed without departing from the scope of the present disclosure.

With continued reference to FIG. 3, once the 4G RF service 110 is connected and both blocks 306 and 308 are answered yes, the control circuit 234 opens the switch 238 to disconnect the 5G TDD RIM 212 from the summation circuit 214 of the second service group 202 (block 310). The control circuit 234 then closes the switch 236 to connect the 4G TDD RIM 206 to the summation circuit 214 of the second service group 202 (block 312). This allows the second service group 202 to use the TDD synchronization process of the first service group 200 without having to wait for user equipment to be present and a call from that user equipment to be established and the associated data transfer under the 5G TDD synchronization process.

With continued reference to FIG. 3, the control circuit 234 determines if all the 5G RUs 116 are synchronized (block 314). If the answer is no, as might be expected immediately after block 312, the control circuit 234 imposes a delay (block 316) and increments a counter (block 318). The control circuit 234 checks to see if the counter is below a predefined threshold (e.g., counter <10) (block 320). If the counter has not been exceeded (i.e., block 320 is answered no), the process 300 loops back to check if all the RUs 116 have synched at block 314. In essence, the control circuit 234 checks every delay period to see if the RUs 116 have synched. If the counter is exceeded at block 320, the control circuit 234 concludes that the RU 116 that did not sync has failed, removes the unsynchronized RU 116 from the list, and raises a hardware failure flag (block 322).

With continued reference to FIG. 3, once the control circuit 234 determines that all the (remaining) 5G RUs 116 are in sync at block 314, then the control circuit 234 opens the switch 236 to disconnect the 4G TDD RIM 206 from the summation circuit 214 of the second service group 202 (block 324). The control circuit 234 closes the switch 238 to connect the 5G TDD RIM 212 to the summation circuit 214 of the second service group 202 (block 326). Once the synchronization and reconnection are done, the control circuit 234 monitors whether the RF services 110 (both 4G and 5G) are still connected (block 328). As long as they are both still connected, the control circuit 234 then checks to see if all of the 5G RUs 116 are out of sync (block 330). If the answer to block 330 is yes, then the process 300 restarts at block 306. Otherwise, the control circuit 234 continues to monitor at block 328. If either the 4G or the 5G RF service 110 has disconnected at block 328, the process 300 also restarts at block 306.

Figure 4:
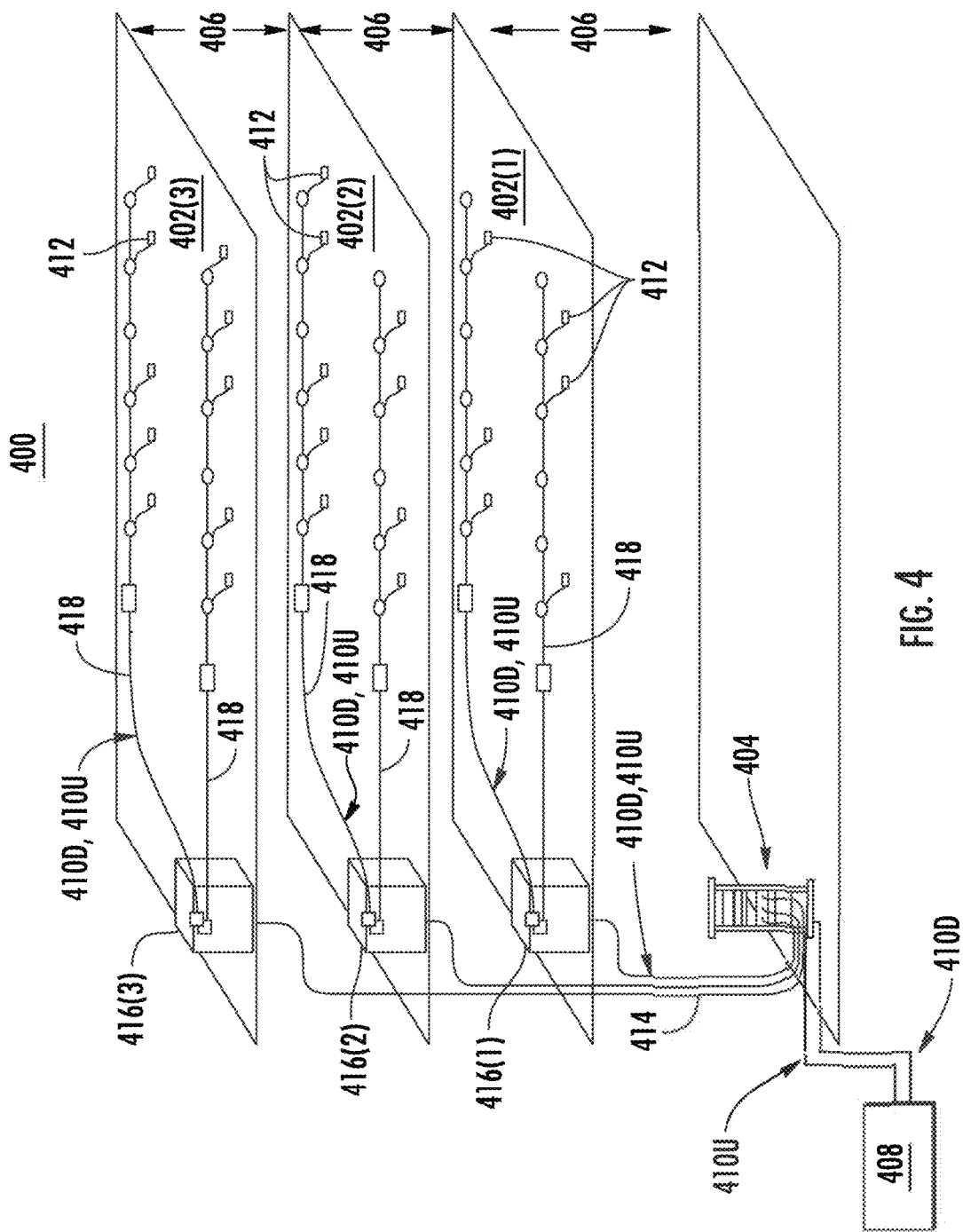
FIG. 4 is diagram of a DAS that synchronizes signals according to the present disclosure deployed in a building.

The DAS 100 of FIG. 1A or 1B with the combined synchronization between the 4G service and the 5G service can be provided in an indoor environment as illustrated in FIG. 4. FIG. 4 is a partial schematic cut-away diagram of an exemplary building infrastructure 400. The building infrastructure 400 includes a first (ground) floor 402(1), a second floor 402(2), and a third floor 402(3). The floors 402(1)-402(3) are serviced by a central unit 404, which may be head end 102 to provide antenna coverage areas 406 (comparable to coverage areas 130 in FIG. 1B) in the building infrastructure 400. The central unit 404 is communicatively coupled to a base station 408 (analogous to RF service 110) to receive downlink communication signals 410D from the base station 408. The central unit 404 is communicatively coupled to a plurality of RUs 412 to distribute the downlink communication signals 410D to the RUs 412 and to receive uplink communication signals 410U from the RUs 412, as previously discussed above. The downlink communication signals 410D and the uplink communication signals 410U communicated between the central unit 404 and the RUs 412 are carried over a riser cable 414. The riser cable 414 may be routed through ICUs 416(1)-416(3) dedicated to each of the floors 402(1)-402(3) that route the downlink communication signals 410D and the uplink communication signals 410U to the RUs 412 and also provide power to the RUs 412 via array cables 418.

Figure 5:
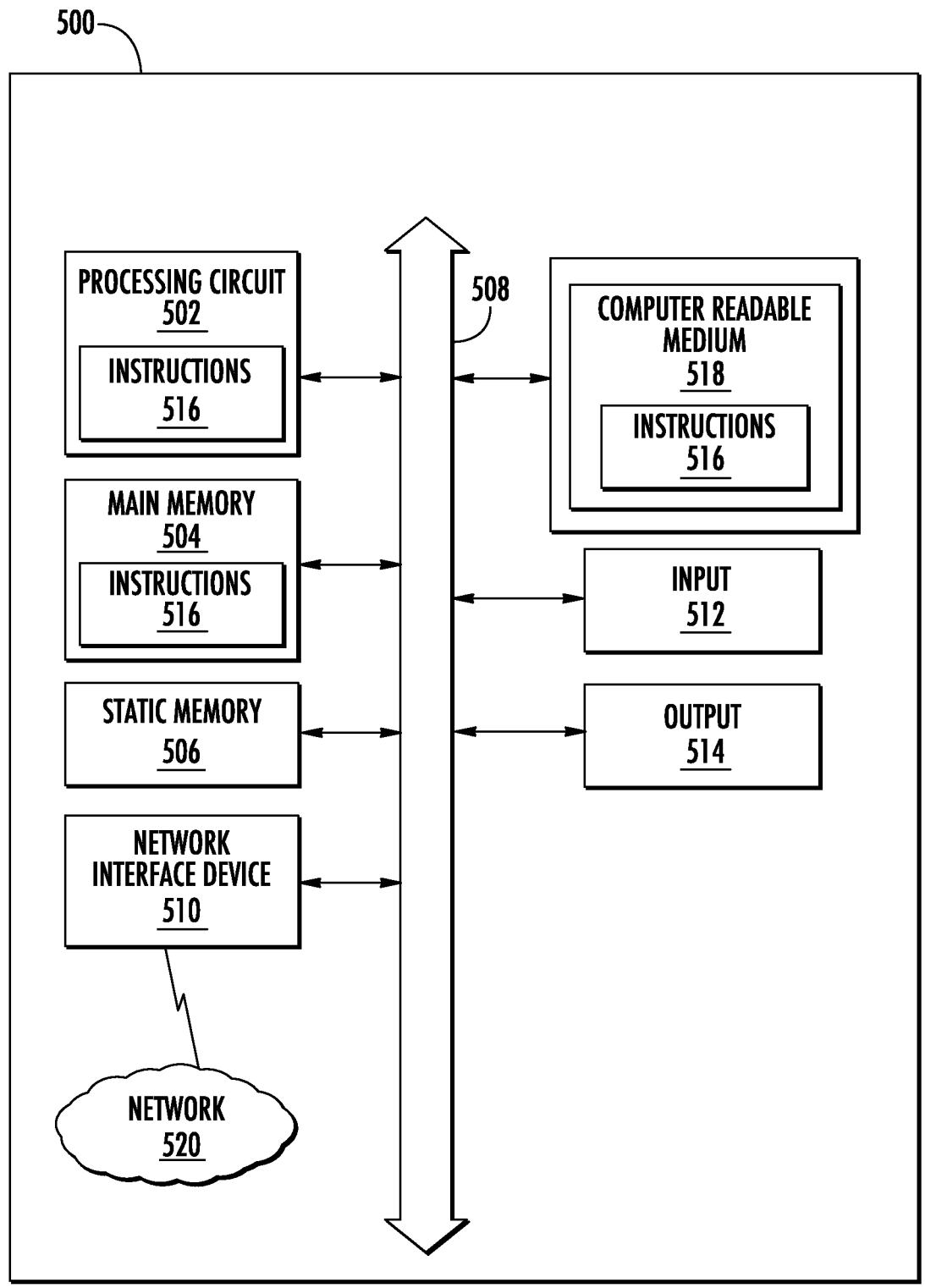
FIG. 5 is a block diagram of a computing device such as may be present in a head end unit to implement the process of FIG. 3 in the DAS of FIG. 1A.

Any of the circuits in the DAS 100 of FIG. 1A such as the control circuit 234 or web management computer 112 can include a computer system 500, such as that shown in FIG. 5, to carry out their functions and operations. With reference to FIG. 5, the computer system 500 includes a set of instructions to provide its designed functionality. The computer system 500 may be connected (e.g., networked) to other machines in a LAN, an intranet, an extranet, or the Internet. The computer system 500 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The computer system 500 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 500 in this embodiment includes a processing circuit or processor 502, a main memory 504 (e.g., read-only memory (ROM), flash memory, dynamic random access memory (DRAM) such as synchronous DRAM (SDRAM), etc.), and a static memory 506 (e.g., flash memory, static random access memory (SRAM), etc.), which may communicate with each other via a data bus 508. Alternatively, the processing circuit 502 may be connected to the main memory 504 and/or static memory 506 directly or via some other connectivity means. The processing circuit 502 may be a controller, and the main memory 504 or static memory 506 may be any type of memory.

The processing circuit 502 represents one or more general-purpose processing circuits such as a microprocessor, central processing unit, or the like. More particularly, the processing circuit 502 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 502 is configured to execute processing logic in instructions 516 for performing the operations and steps discussed herein.

The computer system 500 may further include a network interface device 510. The computer system 500 also may or may not include an input 512 to receive input and selections to be communicated to the computer system 500 when executing instructions. The computer system 500 also may or may not include an output 514, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 500 may or may not include a data storage device that includes instructions 516 stored in a computer-readable medium 518. The instructions 516 may also reside, completely or at least partially, within the main memory 504 and/or within the processing circuit 502 during execution thereof by the computer system 500, the main memory 504 and the processing circuit 502 also constituting the computer-readable medium 518. The instructions 516 may further be transmitted or received over a network 520 via the network interface device 510.

While the computer-readable medium 518 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A head end configured for use in a distributed communication system, the head end comprising:
    a first time division duplex (TDD) radio interface module (RIM) configured to synchronize based on a downlink signal;
    a second TDD RIM;
    a summation circuit having a port coupled thereto, the port configured to couple to a remote unit through an optical fiber;
    a first switch coupling the first TDD RIM to the summation circuit;
    a second switch coupling the second TDD RIM to the summation circuit; and
    a control circuit configured to:
        while in a synchronization state:
            close the first switch to couple the first TDD RIM to the summation circuit; and
            open the second switch to disconnect the second TDD RIM from the summation circuit; and
        after determining that synchronization is complete:
            close the second switch to connect the second TDD RIM to the summation circuit; and
            open the first switch to disconnect the first TDD RIM from the summation circuit.

2. The head end of claim 1, further comprising a second summation circuit coupled to the first TDD RIM.

3. The head end of claim 1, further comprising an optical interface module (OIM) coupled to the summation circuit.

4. The head end of claim 1, wherein the first TDD RIM is configured to service 4G signals.

5. The head end of claim 1, wherein the second TDD RIM is configured to service 5G signals.

6. The head end of claim 1, further comprising a radio frequency interface expander (RIX) coupled to the summation circuit.

7. The head end of claim 6, further comprising an optical interface expander (OIX) coupled to the RIX.

8. A method for synchronizing service groups in a head end, the method comprising:
    initiating a synchronization state based on a user command and while in the synchronization state:
        closing a first switch to couple a first time division duplex (TDD) radio interface module (RIM) to a summation circuit; and
        opening a second switch to disconnect a second TDD RIM from the summation circuit; and
    after determining that synchronization is complete:
        closing the second switch to connect the second TDD RIM to the summation circuit; and
        opening the first switch to disconnect the first TDD RIM from the summation circuit.

9. The method of claim 8, further comprising determining if a 5G radio service is connected to the second TDD RIM.

10. The method of claim 8, further comprising determining if a 4G radio service is connected to the first TDD RIM.

11. The method of claim 8, further comprising determining that the synchronization is complete at least in part by determining that a plurality of remote units are synchronized.

12. The method of claim 8, further comprising determining that the synchronization is not complete.

13. The method of claim 12, wherein after determining that the synchronization is not complete, the method further comprises waiting for a delay to expire.

14. The method of claim 13, further comprising, after the delay has expired, incrementing a counter.

15. The method of claim 14, further comprising determining that the counter has exceeded a threshold and concluding a hardware failure.

16. The method of claim 8, further comprising determining if a radio frequency (RF) service is coupled to the first TDD RIM.

17. The method of claim 8, further comprising monitoring to see that the synchronization is maintained.

* * * * *